(12) United States Patent
Johnson et al.

(10) Patent No.: US 11,078,411 B2
(45) Date of Patent: Aug. 3, 2021

(54) METHODS AND MATERIALS FOR CONTROLLED RELEASE OF DESIRED CHEMISTRIES

(71) Applicant: Research Triangle Institute, Research Triangle Park, NC (US)

(72) Inventors: Leah Marie Johnson, Durham, NC (US); Ginger Denison Rothrock, Cary, NC (US); Chasity Antoninette Norton, Roxboro, NC (US); Sarah Dorothy Shepherd, Raleigh, NC (US); Nicolas Daniel Huffman, Raleigh, NC (US); Jeffrey Brent Mecham, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 257 days.

(21) Appl. No.: 16/071,024

(22) PCT Filed: Jan. 17, 2017

(86) PCT No.: PCT/IB2017/050247
§ 371 (c)(1),
(2) Date: Jul. 18, 2018

(87) PCT Pub. No.: WO2017/125854
PCT Pub. Date: Jul. 27, 2017

(65) Prior Publication Data
US 2019/0031951 A1    Jan. 31, 2019

Related U.S. Application Data

(60) Provisional application No. 62/280,232, filed on Jan. 19, 2016.

(51) Int. Cl.
*C09K 8/92*    (2006.01)
*E21B 47/11*   (2012.01)
(Continued)

(52) U.S. Cl.
CPC .................. *C09K 8/92* (2013.01); *C09K 8/03* (2013.01); *C09K 8/60* (2013.01); *C09K 8/70* (2013.01); *C09K 8/706* (2013.01); *E21B 47/11* (2020.05); *C09K 2208/06* (2013.01); *C09K 2208/10* (2013.01); *C09K 2208/20* (2013.01);
(Continued)

(58) Field of Classification Search
None
See application file for complete search history.

(56) References Cited

U.S. PATENT DOCUMENTS

| 6,444,316 B1 | 9/2002 | Reddy et al. | |
| 2006/0166838 A1* | 7/2006 | Collins | C09K 8/92 507/219 |

(Continued)

*Primary Examiner* — Jeffrey D Washville
(74) *Attorney, Agent, or Firm* — Womble Bond Dickinson (US) LLP

(57) ABSTRACT

The present disclosure relates to delivery and release systems wherein a plurality of particles is provided, and the particles are formed of a vehicle component and a cargo component. The systems and methods particularly can be useful in delivery of various chemicals to a petroleum reservoir. The vehicle component can undergo a change in situ such that at least a portion of the cargo component is released.

12 Claims, 9 Drawing Sheets

(51) Int. Cl.
*C09K 8/60* (2006.01)
*C09K 8/70* (2006.01)
*C09K 8/03* (2006.01)

(52) U.S. Cl.
CPC ...... *C09K 2208/26* (2013.01); *C09K 2208/28* (2013.01); *C09K 2208/32* (2013.01)

(56) References Cited

U.S. PATENT DOCUMENTS

| | | |
|---|---|---|
| 2009/0205829 A1 | 8/2009 | Sullivan et al. |
| 2010/0307745 A1 | 12/2010 | Lafitte et al. |
| 2016/0186044 A1* | 6/2016 | Rothrock ............ C09K 8/03 166/300 |
| 2019/0161670 A1* | 5/2019 | Dreyer ............... C09K 8/03 |

* cited by examiner

Table: Properties of Syntactic After Exposure to Different Pressures*

| Sample Name | Exposure Pressure (psi)** | Storage Modulus at 35°C (MPa) | Storage Modulus at 120°C (MPa) | tan δ at 35°C (X $10^{-3}$) | Maximum tan δ (X $10^{-3}$) | Temp. (°C) at maximum tan δ |
|---|---|---|---|---|---|---|
| Neat Epoxy | 0 | 2684 (±84) | 20 (±1) | 29 (±0.4) | 570 (±16) | 74 (±0.3) |
| | 1500 | 2731 (±65) | 21 (±1) | 27 (±2) | 617 (±63) | 77 (±3) |
| | 7000 | 2711 (±43) | 21 (±0.3) | 28 (±1) | 630 (±26) | 78 (±1) |
| | 15,000 | 2740 (±21) | 22 (±0.6) | 28 (±0.1) | 725 (±27) | 82 (±0.4) |
| S15 | 0 | 1825 (±9) | 125 (±2) | 17 (±0.09) | 318 (±30) | 76 (±0.3) |
| | 1500 | 977 (±30) | 17 (±2) | 51 (±2) | 420 (±4) | 73 (±1) |
| | 7000 | 1299 (±30) | 31 (±4) | 42 (±3) | 374 (±5) | 76 (±1) |
| | 15,000 | 1101 (±46) | 23 (±0.7) | 57 (±1) | 402 (±5) | 73 (±1) |
| S35 | 0 | 2808 (±19) | 151 (±4) | 17 (±0.3) | 365 (±7) | 78 (±0.4) |
| | 1500 | 2865 (±52) | 147 (±23) | 18 (±0.2) | 375 (±11) | 80 (±1) |
| | 7000 | 1795 (±29) | 42 (±3) | 35 (±0.8) | 374 (±18) | 73 (±1) |
| | 15,000 | 1562 (±68) | 34 (±1) | 43 (±1) | 418 (±23) | 74 (±1) |
| S60 | 0 | 3739 (±33) | 179 (±3) | 16 (±0.2) | 393 (±4) | 79 (±0.2) |
| | 1500 | 3767 (±98) | 184 (±7) | 16 (±0.5) | 393 (±3) | 82 (±1) |
| | 7000 | 3636 (±65) | 160 (±2) | 16 (±0.2) | 397 (±2) | 80 (±1) |
| | 15,000 | 2448 (±73) | 57 (±1) | 31 (±1) | 400 (±3) | 77 (±1) |

*Samples were exposed to 8wt% CaCl2, 2 wt% NaCl at 100°C for two hours at indicated pressure.

** 0 psi indicates ambient pressure

FIG. 13

METHODS AND MATERIALS FOR CONTROLLED RELEASE OF DESIRED CHEMISTRIES

CROSS-REFERENCE TO RELATED APPLICATIONS

The present application is a U.S. National Stage of International Patent Application PCT/IB2017/050247, filed Jan. 17, 2017, and claims priority to U.S. Provisional Patent Application No. 62/280,232, filed Jan. 19, 2016. The disclosures of each of the applications noted above are incorporated herein by reference in their entirety.

FIELD OF THE DISCLOSURE

The present disclosure relates to delivery and release compositions, systems, and methods of use thereof. In particular, the present disclosure provides engineered release and stimuli-responsive materials adapted to release a desired chemical or composition in a desired location, such as downhole in a petroleum well and/or formation.

BACKGROUND

There is a need in many industries for delivery and release of various chemistries in a controlled manner. Emerging materials, such as nanoparticles, stimuli-responsive polymers, and chemical sensor technologies, have been shown to be useful in fields where the point of delivery is a controlled environment, such as with personal care materials and pharmaceuticals. Although it would be useful to employ controlled delivery and release methods and materials in other environments, such as in the petroleum industry, the harsh and generally uncontrolled nature of the downhole environment has heretofore prevented useful implementation of such controlled release technologies. It would be particularly desirable to have controlled delivery and release methods and materials for use in a variety of oilfield operations, such as well completions, enhanced oil recovery ("EOR"), and flow control. The challenging downhole environment, however, requires a new set of chemistries, manufacturing processes, and activation mechanisms to provide for actual field utility. Further, due to this challenging environment, as well as the relatively high cost of oilfield chemicals and sensors, there is a need for improved methods and materials with targeted release from the wellbore region to the deep reservoir.

SUMMARY OF THE DISCLOSURE

The present disclosure relates to delivery systems that can be particularly useful in delivery of a variety of chemicals and chemical compositions to harsh environments, such as petroleum formations. In one or more embodiments, a delivery system can comprise a plurality of particles that each comprises a vehicle and a cargo that is retained by the vehicle, which is configured to controllably release at least a portion of the cargo. In further embodiments, the delivery systems can be defined in relation to one or more of the following statements, which can be combined in any number and/or order.

The vehicle can be in the form of a shell defining an interior space in which the cargo is retained.

The shell can comprise a plurality of layers.

The interior space can comprise a core material with which the cargo is combined.

The cargo can be configured as a plurality of units within the interior space defined by the shell.

The cargo can be controllably diffusible through the shell.

The vehicle can be substantially in the form of a monolith.

The vehicle can be at least partially degradable.

The vehicle can be at least partially degradable via a mechanism selected from the group consisting of thermal degradation, oxidative degradation, chemical degradation, photodegradation, pressure-dependent degradation, ultrasonic degradation, mechanical degradation, and combinations thereof.

The vehicle can comprise a polymeric material.

The polymeric material can comprise degradable crosslinks.

The cargo can comprise at least one material selected from the group consisting of breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

The particles can have an average size of about 5 μm or less.

The particles can have an average size of about 500 nm or less.

The present disclosure further can provide methods for delivering a cargo to a desired location, such as a petroleum reservoir. In one or more embodiments, a method for providing a cargo to a petroleum reservoir can comprise delivering to the petroleum reservoir a plurality of particles that each comprise a vehicle that is retaining the cargo, wherein the petroleum reservoir exhibits one or more conditions under which the plurality of particles release at least a portion of the cargo. In further embodiments, the delivery methods can be defined in relation to one or more of the following statements, which can be combined in any number and/or order.

The vehicle can comprise a polymeric material.

The petroleum reservoir can exhibit one or more conditions under which the polymeric material at least partially degrades.

The polymeric material can comprise degradable crosslinks.

The vehicle can be in the form of a shell defining an interior space in which the cargo is retained.

The shell can comprise a plurality of layers.

The interior space can comprise a core material with which the cargo is combined.

The cargo can be configured as a plurality of units within the interior space defined by the shell.

The cargo can controllably diffuse through the shell in the petroleum reservoir.

The vehicle can be substantially in the form of a monolith.

The cargo can comprise at least one material selected from the group consisting of breakers, scale inhibitors, corrosion inhibitors, crosslinkers, surfactants, cement accelerators, acidizing agents, sensors, bactericides, formation damage control agents, emulsifiers, viscosifiers, tracers, and combinations thereof.

The particles can have an average size of about 500 μm or less

The particles can have an average size of about 1 μm or less.

The particles can have an average size of about 500 nm or less.

In one or more embodiments, the present disclosure can provide controlled release particles than can comprise the cargo as the majority component. Particularly, the cargo can comprise up to 100% by weight of the particles (e.g., 10% by weight to 100% by weight) based on the total weight of the particles. Such particles can be in a multi-layer form and can include one or more labile crosslinks in one or more of the layers to provide for controlled release of the cargo.

The invention includes, without limitation, the following embodiments:

Embodiment 1

A delivery system comprising a plurality of particles that each comprise a vehicle and a cargo that is retained by the vehicle, which vehicle is configured to controllably release at least a portion of the cargo.

Embodiment 2

The delivery system of any previous or subsequent embodiment, wherein the vehicle is in the form of a shell defining an interior space in which the cargo is retained.

Embodiment 3

The delivery system of any previous or subsequent embodiment, wherein the shell comprises a plurality of layers.

Embodiment 4

The delivery system of any previous or subsequent embodiment, wherein the interior space comprises a core material with which the cargo is combined.

Embodiment 5

The delivery system of any previous or subsequent embodiment, wherein the cargo is configured as a plurality of units within the interior space defined by the shell.

Embodiment 6

The delivery system of any previous or subsequent embodiment, wherein the cargo is controllably diffusible through the shell.

Embodiment 7

The delivery system of any previous or subsequent embodiment, wherein the vehicle is substantially in the form of a monolith.

Embodiment 8

The delivery system of any previous or subsequent embodiment, wherein the vehicle is at least partially degradable.

Embodiment 9

The delivery system of any previous or subsequent embodiment, wherein the vehicle is at least partially degradable via a mechanism selected from the group consisting of thermal degradation, oxidative degradation, chemical degradation, photodegradation, pressure-dependent degradation, ultrasonic degradation, mechanical degradation, and combinations thereof.

Embodiment 10

The delivery system of any previous or subsequent embodiment, wherein the vehicle comprises a polymeric material.

Embodiment 11

The delivery system of any previous or subsequent embodiment, wherein the polymeric material comprises degradable crosslinks.

Embodiment 12

The delivery system of any previous or subsequent embodiment, wherein the cargo comprises at least one material selected from the group consisting of breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

Embodiment 13

The delivery system of any previous or subsequent embodiment, wherein the particles have an average size of about 5 μm or less.

Embodiment 14

The delivery system of any previous embodiment, wherein the particles have an average size of about 500 nm or less.

Embodiment 15

A method for providing a cargo to a petroleum reservoir, the method comprising delivering to the petroleum reservoir a plurality of particles that each comprise a vehicle that is retaining the cargo, wherein the petroleum reservoir exhibits one or more conditions under which the plurality of particles release at least a portion of the cargo.

Embodiment 16

The method of any previous or subsequent embodiment, wherein the vehicle comprises a polymeric material.

Embodiment 17

The method of any previous or subsequent embodiment, wherein the petroleum reservoir exhibits one or more conditions under which the polymeric material at least partially degrades.

Embodiment 18

The method of any previous or subsequent embodiment, wherein the polymeric material comprises degradable crosslinks.

Embodiment 19

The method of any previous or subsequent embodiment, wherein the vehicle is in the form of a shell defining an interior space in which the cargo is retained.

Embodiment 20

The method of any previous or subsequent embodiment, wherein the shell comprises a plurality of layers.

Embodiment 21

The method of any previous or subsequent embodiment, wherein the interior space comprises a core material with which the cargo is combined.

Embodiment 22

The method of any previous or subsequent embodiment, wherein the cargo is configured as a plurality of units within the interior space defined by the shell.

Embodiment 23

The method of any previous or subsequent embodiment, wherein the cargo controllably diffuses through the shell in the petroleum reservoir.

Embodiment 24

The method of any previous or subsequent embodiment, wherein the vehicle is substantially in the form of a monolith.

Embodiment 25

The method of any previous or subsequent embodiment, wherein the cargo comprises at least one material selected from the group consisting of breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

Embodiment 26

The method of any previous or subsequent embodiment, wherein the particles have an average size of about 1 µm or less.

Embodiment 27

The method of any previous embodiment, wherein the particles have an average size of about 500 nm or less.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as combinable unless the context clearly dictates otherwise.

BRIEF DESCRIPTION OF THE FIGURES

Reference will now be made to the accompanying drawings, which are not necessarily drawn to scale, and wherein:

FIG. 13 shows a listing in tabular form of the physical properties of the epoxy material containing the hollow shells illustrated in FIG. 11;

DETAILED DESCRIPTION

Figure 1:
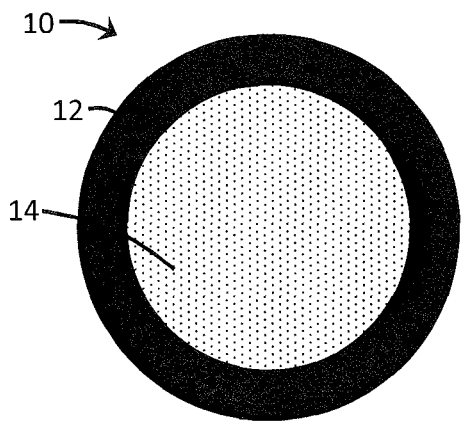
FIG. 1 shows a cross-section of a multi-component particle according to one or more embodiments of the present disclosure.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one or more embodiments, the present disclosure provides delivery and release compositions and systems and methods of use thereof. The compositions and systems can include a plurality of particles that are configured to retain a cargo under a certain conditions but release at least a portion of the cargo under one or more different conditions. For example, the release conditions can be conditions that are typically present in a petroleum bearing formation. The disclosure thus can provide engineered release and stimuli-responsive materials that are configured particularly for use in a downhole environment, which typically exhibits conditions that are significantly different from standard atmospheric conditions (e.g., standard temperature and pressure—about 70° C. and about 15 psi). The compositions and system can be especially useful for delivery of oilfield chemicals, such as surfactants, stimulation agents, breakers, scale inhibitors, and metal salts (as non-limiting examples) in various oilfield applications, such as production enhancement, well constructions, and flow assurance.

Compositions and systems of the present disclosure can comprise a cargo component that is delivered to a desired location for a desired purpose and a vehicle component that is initially in combination with the cargo but releases the cargo after delivery to the desired location. The cargo and vehicle can be assembled so as to form a plurality of particles that can take on a variety of configurations. The particles can substantially prevent release of the cargo for a certain time period and then allow release of the cargo thereafter, and the delayed release can be adjusted to the time necessary for the compositions to reach the desired location. For example, when delivered to a petroleum formation, the particles can remain substantially intact so that the cargo is not released during pumping down the wellbore; however, the particles can undergo a change after passing from the wellbore into the formation so that at least a portion of the cargo is released in the formation.

The vehicle component of the particles can be formed of a polymer or a polymer composite. The chemical nature of the polymer or polymer composite can vary based upon the nature of the cargo, the conditions of the location to which the particles will be provided, and the method by which the particles are prepared.

In some embodiments, a particle or the vehicle component thereof can be prepared by chain growth polymerization. As non-limiting examples, chain growth polymerization methods suitable for preparing particles or the vehicle component thereof can include radical chain polymerization, anionic chain polymerization, and cationic chain polymerization. In one non-limiting example, the vehicle can be prepared using radical chain polymerization of monomers containing one or more acrylate or vinyl functionalities. Non-limiting examples of acrylate monomers include butyl acrylate, butyl methacrylate, ethyl acrylate, ethylene glycol methyl ether methacrylate, hydroxyethyl acrylate, hexanediol diacrylate, urethane acrylate, epoxy acrylate, glycidyl methacrylate, methyl methacrylate, methacrylic acid, 2-(N-mopholino)-ethyl methacrylate, vinyl laurate, allyl methacrylate, ethylene glycol dimethacrylate, pentaerythritol tetraacarylate. Non-limiting examples of vinyl monomers includes acrylic acid, acrylamide, acrylonitrile, fluorostyrene, maleic anhydride, styrene, 4-vinylbiphenyl, N-isopropylacryamide, 4-vinylpyridine, diisopropenylbenze, N,N-methylenebisacrylamide, and divinylbenzene. In a preferred example, the vehicle can be prepared by emulsification of an acrylate monomer and a photoinitiator within an aqueous continuous phase followed by radical chain polymerization by irradiation with light. Vehicles formed in this manner can exhibit a glass transition temperature (Tg) of about 60° C. or greater. In another preferred example, anionic chain polymerization can occur at the interface between an alcohol and a cyanoacrylate to generate a core-shell particle.

In one or more embodiments, a particle or a vehicle component thereof can be prepared by step growth polymerization. Non-limiting examples of step growth polymerization for preparing particles include amidation, esterification, formation of urethanes, formation of epoxies, formation of polysiloxanes, formation of polyureas, formation of phenol formaldehyde resins, and formation of polysulfides. In one non-limiting example, a particle or the vehicle component thereof can be prepared via step growth polymerization using a thermoset resin with one or more monomers containing more than two functional groups per monomer. In a preferred example, the particle or the vehicle component thereof can be prepared via step growth polymerization using a monomer with two epoxy functional groups and a monomer with two primary amine groups. In another preferred example, the particle or the vehicle component thereof can be prepared via step growth polymerization using a monomer with hydroxyl groups and a monomer with diisocyanate groups. In another non-limiting example, the particle or the vehicle component thereof can be prepared using a Diels Alder reaction, such as with a maleimide monomer and furan monomer.

The cargo material included in the particles of the present disclosure can comprise any material that is desire for delivery and that can be unitized in substantially small sizes to be amenable to being particularized in size ranges described herein. In one or more embodiments, a cargo material can be aqueous, lipophilic, polymeric, gaseous, organic, or any combination thereof. The nature of the vehicle may be chosen based upon the nature of the cargo. For example, it may be desirable in some embodiments to lipophilic vehicles to carry lipophilic cargo. Other combinations are also encompassed by the present disclosure.

In some embodiments, a cargo material can particularly be a material that is suitable for use in the petroleum industry, specifically chemicals, chemical compositions, and chemical systems that may be pumped downhole in a petroleum well. In some embodiments, the cargo can be configured specifically for delivery into a petroleum formation—i.e., into the pores of the formation. Non-limiting examples of materials that may be delivered as a cargo component according to the present disclosure include breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

Non-limiting examples of breakers that may be used according to the present disclosure include peroxydisulfates, organic peroxides, enzymes, oxidizing agents, acids, and combinations thereof.

Non-limiting examples of scale inhibitors that may be used according to the present disclosure include sodium hydroxide, calcium carbonate, sodium bicarbonate, potassium hydroxide, magnesium oxide, calcium oxide, polyacrylates, polyphosphates, phosphonates, and combinations thereof.

Non-limiting examples of corrosion inhibitors that may be used according to the present disclosure include ammonium sulfites, bisulfite blends, zinc carbonate, zinc chromate, hydrated lime, fatty amine salts of alkylphosphates, cationic polar amines, ethoxylated amines, tertiary cyclic amines, tertiary cyclic amines, carbonates, and combinations thereof.

Non-limiting examples of cross linkers that may be used according to the present disclosure include Zr(IV), organotitanates, borates, zirconium compounds, organozirconates, antimonates, aluminum compounds, polyamines, tetramethylenediamine, methanol, sodium thiosulfate, sodium dithiocarbamate, alkanolamine, thiols, imidazolines, calcinated dolomite, Cu(I), Cu(II), and combinations thereof.

Non-limiting examples of formation damage control agents that may be used according to the present disclosure include potassium chloride, ammonium chloride, sodium chloride, gypsum, sodium silicate, polyacrylamide, poly(acrylamide-co-acrylic acid), quaternary ammonium polymers, lignosulfonate derivatives, xanthan gum, guar gum, sodium poly(styrene sulfonate-co-maleic anhydride), PEO, hydroxyl ethyl cellulose, silicon halides, foams, and combinations thereof.

Non-limiting examples of surfactants in the particle include fluorochemicals, polyacrylamide, acrylamide copolymers, guar gum, HEC, karaya gum, organic amines, quaternary ammonium salts, alkylphenol ethoxylates, poly(ethylene oxide-co-propylene glycol, alkyl or alkylaryl polyoxyalkylene phosphate esters, and combinations thereof.

Non-limiting examples of acidizing agents that may be used according to the present disclosure include fumaric acid, formic acid, hydrochloric acid, acetic acid, hydrofluoric acid, sulfamic acid, chloroacetic acid, and combinations thereof.

Non-limiting examples of bactericides that may be used according to the present disclosure include paraformaldehyde, glutaraldehyde, sodium hydroxide, lime derivatives, dithiocarbamates, isothiazolones, diethylamine, chlorophenates, quaternary amines, and combinations thereof.

Non-limiting examples of emulsifiers that may be used according to the present disclosure particle include fatty acid amines, fatty acid salts, petroleum sulfonates, lignosulfonates, oil soluble surfactants, and combinations thereof.

Non-limiting examples of viscosifiers in the particle include HEC, sulfonated polystyrene, phosphate esters, poly(acrylamide-co-dodecylmethacrylate), PVA, xanthan gum, guar gum, crosslinked polymers, acrylamides, CMHPG, locust bean gum, karaya gum, gum traganth, and combinations thereof.

Non-limiting examples of gases that may be used according to the present disclosure include $CO_2$, $N_2$, $O_2$, and combinations thereof.

In one or more embodiments, the cargo component of the particles can be configured to undergo a change and/or form a product when delivered to the site of interest and encountering the conditions present therein. For example, the cargo can comprise two or more components that are non-reactive at standard conditions but that are reactive when encountering the surrounding environment in the delivery site. Thus, upon contact with the environment, the cargo can undergo a chemical reaction to produce a product. As a non-limiting example, the reaction product can be a material that is more safely formed in situ that used in the final state to form the particles to be delivered. In another non-limiting example, the reaction can generate heat and/or the reaction product can itself be reactive with other materials present in the delivery site. Generation of heat can be useful, for example, to enhance oil mobility. As yet another non-limiting example, the reaction can be configured for production of a gas, such as $CO_2$, which can be useful to enhance oil mobility.

Particles useful in the compositions, systems, and methods of the present disclosure can have a variety of different structures. Specifically, the manner of combination of the cargo with the vehicle can vary. The particles preferably are substantially spherical; however, the particles may be irregularly shaped. The particles can have an outer surface, and the particles can be configured such that the vehicle component forms at least a portion of the outer surface. In some embodiments, however, the cargo component can form up to 50% (+/−5%) of the area of the outer surface. In some embodiments, the cargo component can be completely surrounded by the vehicle component. In further embodiments, the cargo component can be substantially embedded in the vehicle component. In one or more embodiments, the particles can comprise the vehicle, the cargo, and one or more further components, such as an encapsulating layer that can substantially surround the particle, or such as a matrix material with which the cargo component can be combined. Non-limiting examples of the types of particles that can be encompassed by the present disclosure are further described below in relation to FIG. 1 through FIG. 7. As can be seen, the particle systems can be mononuclear, polynuclear, matrix, or combinations thereof.

In FIG. 1, the particle 10 is formed of a vehicle 12 that is substantially in the form of a shell surrounding a cargo 14 that is substantially in the form of a core that substantially fills the interior of the particle. The cargo 14 can be a single chemical, a plurality of chemicals, a single composition, or a plurality of compositions.

Figure 2:
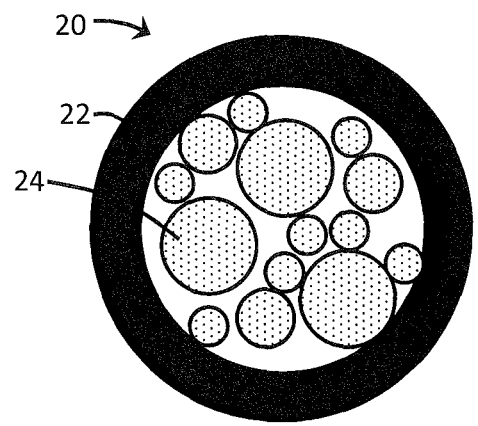
FIG. 2 shows a cross-section of a multi-component particle according to one or more further embodiments of the present disclosure.
Figure 3:
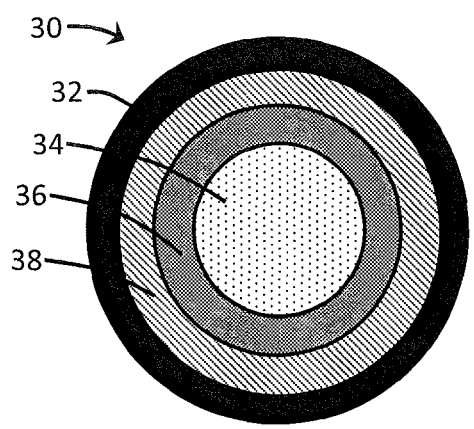
FIG. 3 shows a cross-section of a multi-component particle according to one or more further embodiments of the present disclosure.

In FIG. 2, the particle 20 is formed of a vehicle 22 that is substantially in the form of a shell surrounding a cargo 24 that is retained within the open core defined by the vehicle. Although the cargo 24 is illustrated as a plurality of units, it is understood that the cargo can be substantially a single unit. Further, a plurality of different cargo components can be included as a plurality of units within the open core of the vehicle.

In FIG. 3, the particle 30 is again formed of a vehicle 32 that is substantially in the form of a shell surrounding a cargo 34. The particle 30 also includes a first intermediate layer 36 and a second intermediate layer 38. Each of the intermediate layers can have a different composition. The intermediate layers can function as a vehicle or as a cargo. As such, the particle 30 can provide different types of release and/or can provide release of different types of cargo. For example, the vehicle 32 can degrade so that a cargo material in the second intermediate layer 38 can be first released, a cargo material in the first intermediate layer 36 can later be released, and the main cargo 34 can finally be released. The intermediate layers can provide a variety of further functions that may specifically alter release of the cargo.

Figure 4:
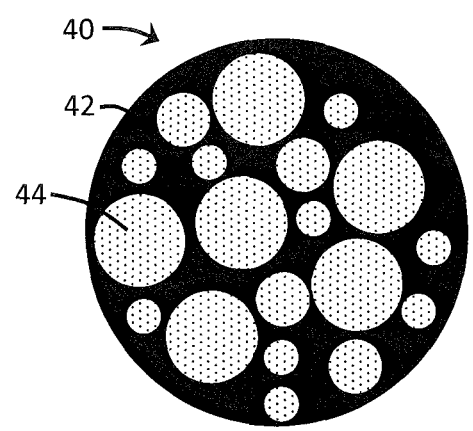
FIG. 4 shows a cross-section of a multi-component particle according to one or more further embodiments of the present disclosure.

In FIG. 4, the particle 40 is formed of a vehicle that is substantially in the form of a monolith, and the cargo 44 is dispersed throughout the monolithic vehicle. The term "dispersed" should not be viewed as limiting, and the cargo can be otherwise intermixed with the monolithic vehicle component. Although the cargo 44 is illustrated as a plurality of units, it is understood that the cargo can be substantially a single unit. Further, a plurality of different cargo components can be included as a plurality of units within the substantially continuous vehicle component.

Figure 5:
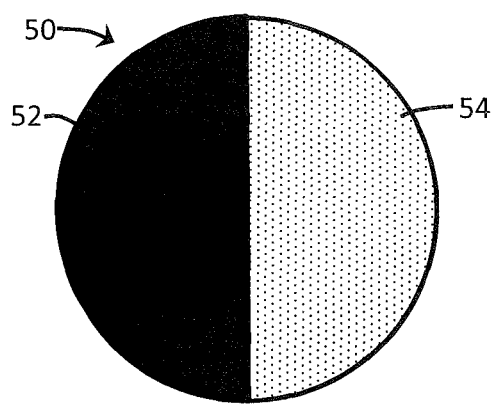
FIG. 5 shows a cross-section of a multi-component particle according to one or more further embodiments of the present disclosure.

In FIG. 5, the particle 50 comprises a vehicle component 52 and a cargo component 54 that are combined in substantially a Janus configuration. As illustrated, the respective components are substantially hemispheric; however, it is understood that either of the vehicle 52 and the cargo 54 can comprise greater than 50% of the surface area of the particle.

Figure 6:
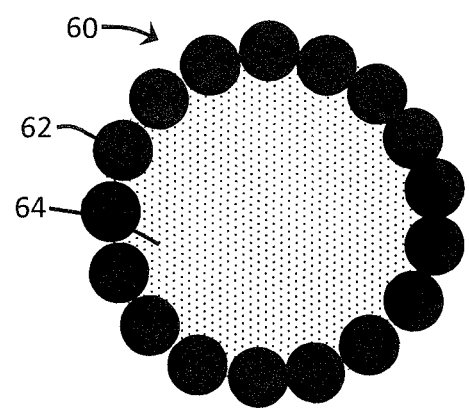
FIG. 6 shows a cross-section of a multi-component particle according to one or more further embodiments of the present disclosure.

In FIG. 6, the particle 60 is formed of a plurality of vehicle units 62 surrounding a cargo 64 that is substantially in the form of a core. For example, such particles can be formed as a Pickering emulsion whereby solid particles of the vehicle component stabilize an emulsion of the cargo component.

Figure 7:
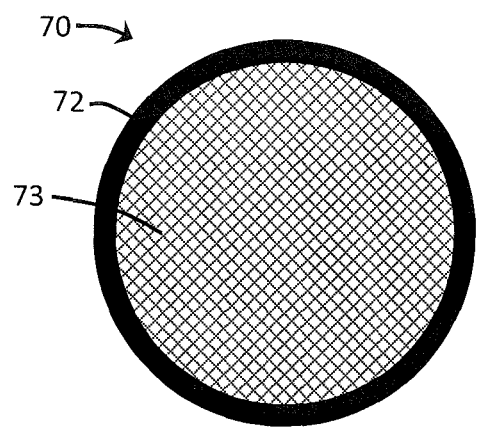
FIG. 7 shows a cross-section of a multi-component particle according to one or more further embodiments of the present disclosure.

In one or more embodiments, the particle can include a matrix material wherein the cargo can be in various combinations with a vehicle material. The matrix may form substantially the entire particle. In some embodiments, a shell can be formed around the matrix and may be formed of a vehicle material that is the same vehicle material used in the matrix or is a different vehicle material. In FIG. 7, for example, the particle 70 is formed of a matrix 73 wherein the cargo is blended or otherwise combined with a vehicle. For example, the matrix 73 can comprise a co-polymer wherein a vehicle monomer is copolymerized with a cargo monomer. The matrix 73 can be configured so that the vehicle monomer may degrade to release the cargo monomer. Alternatively, the matrix 73 can comprise a vehicle component and a cargo component that are distinct from one another, but the vehicle component and the cargo component can be blended or otherwise intermixed. For example, the matrix 73 an comprise a hydrogel material that contains the cargo. A vehicle component shell 72 is shown surrounding the matrix 73; however, it is understood that the vehicle component shell can be optional. Thus, the matrix 73 can form substantially the entirety of the particle.

In one or more embodiments, particles according to the present disclosure can comprise varying amounts of cargo and vehicle. The total cargo component can comprise about 5% by weight to about 100% by weight of the particles based upon the total particle weight. In various embodiments, the cargo concentration can be any of the following: about 5% by weight to about 95% by weight; about 10% by weight to about 90% by weight; about 25% by weight to about 75% by weight, about 35% to about 60% by weight; about 25% to about 99% by weight; about 40% by weight to about 95% by weight; about 50% by weight to about 90% by weight; about 50% by weight to about 99% by weight; about 60% by weight to about 99% by weight; about 70% by weight to about 99% by weight; or about 80% by weight to about 99% by weight. In some embodiments, the particles can consist essentially of the cargo component or can consist of the cargo component. Particles consisting essentially of the cargo component can include, for example, labile crosslinking groups that crosslink one or more layers of the cargo component together to provide for controlled release through breaking of the crosslinks in situ. In each of the above cargo concentration ranges, the remaining content of the particles can be formed by the vehicle component; however, additional materials may also be included. The vehicle, for example, can comprise about 1% by weight to about 95% by weight, about 25% by weight to about 75% by weight, or about 40% by weight to about 65% by weight of the particles, based on the total weight of the particles.

The material(s) used in forming the vehicle component of the particles preferably are configured to resist breakdown or degradation for a time so that delivery of the cargo can be delayed as desired, even in harsh environments. The materials preferably impart chemical and/or mechanical properties to the particle or the vehicle component thereof such that the cargo can be released substantially only at the desired time after delivery. For example, the polymer or polymer composite can be configured for degradation under one or more conditions, and the cargo can be released from the particle when the vehicle at least partially degrades. In one or more embodiments, degradation can proceed via one or more of thermal degradation, oxidative degradation, chemical degradation, photodegradation, pressure-dependent degradation, ultrasonic degradation, and mechanical degradation.

In order to provide control of the degradation, the vehicle can be formed so as to include one or more chemical functionalities. In non-limiting examples, the vehicle-forming material can include polymers with hydrolytically cleavable groups that degrade with time such as such as polyesters, polyurethanes, polyamides, poly(dialkyl siloxanes), and polycarbonates. In a preferred example, the hydrolytically cleavable group can reside in the polymer main chain structure resulting in chain scission after hydrolysis. In one non-limiting example, the vehicle material can include polymers that thermally degrade such as polyesters, polyurethanes, polyamides, poly(dialkyl siloxanes), and polycarbonates. In one non-limiting example, the vehicle can contain a thermal labile group, such as an azo compound, that degrades at a defined temperature. The vehicle particularly can be configured such thermal degradation proceeds at a temperature of about 40° C. or greater, about 50° C. or greater, about 60° C. or greater, about 70° C. or greater, or about 80° C. or greater.

In some embodiments, the vehicle material can include one or more components configured to degrade upon contact with a further material. As a non-limiting example, the use of epoxy ester polymer compositions in the vehicle component can be useful for controlled release of cargo via vehicle degradation upon contact with water. Other esters also can be utilized for such mechanism. The rate of vehicle degradation can be controlled based upon the ester concentration in the vehicle.

In one or more embodiments, the vehicle material can be configured for in-situ generation of a reactive species that can cause degradation of the vehicle. Non-limiting examples of reactive species that may be utilized include radical initiators, such as azo compounds (e.g., azobisisobutyronitrile), organic peroxides (e.g., benzoyl peroxide, tert-butyl peroxide, cumyl hydroperoxides, ketone peroxides), hydrogen peroxide, and cerium ammonium nitrate. The materials utilized in forming the vehicle can be configured to be substantially non-reactive under certain conditions (e.g., an ambient temperature range, such as up to about 30° C., up to about 35° C., or up to about 40° C.) and then be reactive at higher temperatures so that radical formation proceeds and causes vehicle degradation.

In further embodiments, a phase change material can be included in the vehicle material to provide vehicle degradation. As further described below, the phase change material can be configured to be substantially solid under certain conditions (e.g., an ambient temperature range, such as up to about 30° C., up to about 35° C., or up to about 40° C.) and then become flowable (i.e., substantially liquefy or become a flowable, semi-solid material) at higher temperatures so that the vehicle releases the cargo component.

Vehicles that contain degradable crosslinks comprising thermo-responsive Diels-Alder (DA) polymer systems can be used to prepare particles. These thermally reversible materials polymerize via covalent cycloaddition reactions at low temperatures but revert to monomeric precursors at higher temperatures, a depolymerization reaction termed retro-Diels Alder. Various DA groups exist that differ in degradation profiles based on temperatures, thereby accommodating acid release at a variety of conditions. Moreover, the DA groups are readily incorporated into traditional thermoset systems (e.g., epoxies, urethanes) affording hydrophobic encapsulants impervious to water penetration until decomposition occurs at defined temperature ranges. Examples of DA monomers include 1,3-butadiene, ethylene, dimethyl maleate, phenyl vinyl sulfoxide, methylene coumalate, furan, 2,3-Dimethoxy-1,3-butadiene, 1-Methoxy-1,3-cyclohexadiene, 4-Chloro-7-nitrobenzofurazan, and combinations thereof.

In some embodiments, the vehicle can comprise a minor component of the particles while still providing for controlled release of the cargo. For example, particles can be formed from a plurality of layers of cargo, and the vehicle can be configured as one or more labile crosslinking groups. The crosslinking groups can maintain the particle configuration until contact with a material and/or condition adapted to break the crosslinks. For example, oil labile crosslinking groups can be utilized. As such, once the crosslinked particles contact oil in a petroleum reservoir, the oil labile crosslinking groups can be degraded or otherwise broken, and the cargo layers can be released from the particle. Two or more layers of the multi-layer particles can include the labile crosslinks, and the concentration of the crosslinking groups can be adjusted to control release rate. Moreover, two or more different types of labile crosslinking groups can be used to vary the conditions under which different layers of the particles are released.

In one or more embodiments, the vehicle can be configured to remain substantially intact at the point of delivery, even in a harsh environment such as a petroleum formation; however, the vehicle can be further configured to release the cargo over time. As a non-limiting example, the vehicle may be substantially in the form of a shell surrounding a core wherein the cargo is retained, and the shell can be configured so that the cargo may diffuse therethrough over time. In one or more embodiments, diffusion may be substantially absent under standard conditions (e.g., up to a minimum temperature, such as up to about 40° C., up to about 50° C., or up to about 60° C., or up to a minimum pressure, such as up to about 20 psi, up to about 50 psi, or up to about 100), but diffusion may be present when such standard conditions are exceeded. As non-limiting examples, by altering the polymer crosslink density, hydrophobic/hydrophilic balance, particle size, and/or ionic properties, release of one or more cargo components from the particles can be delayed and/or sustained as desired. Other methodologies also can be utilized to provide for sustained and/or delayed release of cargo. In some embodiments, diffusive particles can include an encapsulating layer. For example, a core/shell system wherein the shell is configured for diffusion of cargo from the core, an encapsulating layer can be provided around the shell so that diffusion may be delayed. In one non-limiting example, the polymer shell can have a glass transition temperature above which the polymer shell becomes rubbery, which allows the diffusion of the cargo through the shell and subsequent release from the particle.

In some embodiments, delayed release of a cargo component can be measured from the time the particles are prepared, from the time of first delivery of the particles (e.g., the beginning of pumping down a wellbore), or from the time that the particles first encounter the conditions of the desired delivery location (e.g., the conditions of a petroleum formation). Delayed release can be for a time of about 1 hr or greater, about 2 hrs or greater, about 4 hrs or greater, about 8 hrs or greater, about 12 hrs or greater, about 24 hrs or greater, about 2 days or greater, about 3 days or greater, about 4 days or greater, about 5 days or greater, about 1 week or greater, or about 2 weeks or greater. In each instance, the maximum time of delayed release can be about 3 weeks, about 4 weeks, or about 6 weeks. In particular embodiments, delayed release can be a time of about 1 hr to about 1 week, about 2 hrs to about 5 days, about 4 hrs to about 2 days, or about 8 hrs to about 24 hrs. Sustained release can be calculated from the time cargo release begins, from the time of first delivery of the particles, or from the time that the particles first encounter the conditions of the desired delivery location. In some embodiments, release can be delayed as noted above and also be sustained once release begins. Sustained release can proceed for a time of about 12 hrs or greater, about 24 hrs or greater, about 2 days or greater, about 3 days or greater, about 4 days or greater, about 5 days or greater, about 1 week or greater, or about 2 weeks or greater. In each instance, the maximum duration of sustained release can be about 3 weeks, about 4 weeks, about 6 weeks, or about 12 weeks. In particular embodiments, sustained release can be a time of about 12 hrs to about 6 weeks, about 24 hrs to about 4 weeks, or about 2 days to about 2 weeks.

In one or more embodiments, the disclosure can relate the nature of the compositions and systems to the conditions to which they are subjected. More particularly, the compositions and systems can exhibit a first set of characteristics and/or functions under a first set of conditions and can exhibit a second set of characteristics and/or functions under a second set of conditions. The first set of conditions (which may be referred to as "standard conditions") can be conditions under which the particles are prepared and/or stored, and the second set of conditions can include conditions present at the location where the particles are delivered. The first set of conditions, for example, can be approximately room temperature and pressure. The second set of conditions, for example, can be conditions encountered in a petroleum formation. As discussed above, release of cargo from the particles can be dependent upon the conditions encountered by the particles. Specifically, degradation of the vehicle may be substantially absent under the first set of conditions but be present under the second set of conditions. Similarly, diffusion may be substantially absent under the first set of conditions but be present under the second set of conditions. The second set of conditions may thus be characterized as the conditions under which cargo release may proceed.

In some embodiments, the conditions under which cargo release may proceed can particularly relate to temperature. For example, cargo release may be provided at temperatures of about 40° C. or greater, about 50° C. or greater, about 60° C. or greater, about 70° C. or greater, about 80° C. or greater, about 90° C. or greater, or about 100° C. or greater. In some embodiments, such temperatures can have an upper bounds that is consistent with the average maximum temperature of a petroleum formation. More particularly, cargo release may be provided at temperatures of about 40° C. to about 250° C., about 50° C. to about 225° C., about 60° C. to about 200° C., or about 70° C. to about 180° C.

In some embodiments, the conditions under which cargo release may proceed can particularly relate to pressure. For example, cargo release may be provided at pressures of about 20 psi or greater, about 100 psi or greater, about 500 psi or greater, about 1,000 psi or greater, about 2,000 psi or greater, about 3,000 psi or greater, or about 5,000 psi or greater. In some embodiments, such pressures can have an upper bounds that is consistent with the average maximum pressure of a petroleum formation. More particularly, cargo release may be provided at pressures of about 20 psi to about 15,000 psi, about 50 psi to about 12,000 psi, about 100 psi to about 10,000 psi, or about 250 psi to about 5,000 psi.

As further examples, the conditions under which cargo release may proceed can particularly relate to pH. In particular, cargo release may proceed when the particles are subjected to a pH change (increase or decrease) of at least about 1, at least about 2, or at least about 4. The pH change can be a change of about 1 to about 12, about 1.5 to about 10, or about 2 to about 8.

As yet further examples, the conditions under which cargo release may proceed can particularly relate to shear. In particular, the particles may be configured to be substantially stable when subjected to relatively low shear conditions but be configured for cargo release when subjected to a shear of at least 1,000 $s^{-1}$, at least 5,000 $s^{-1}$, or at least 10,000 $s^{-1}$. For example, shear rates that may cause release of the cargo can be about 1,000 $s^{-1}$ to about 12,000 $s^{-1}$, about 1,500 $s^{-1}$ to about 10,000 $s^{-1}$, or about 2,000 $s^{-1}$ to about 8,000 $s^{-1}$.

As still further examples, the conditions under which cargo release may proceed can particularly relate to salinity. In particular, the particles may be configured to be substantially stable when subjected to relatively low salinity conditions but be configured for cargo release when subject to increased salinity conditions, such as being subjected to salinity conditions of about 1,000 ppm or greater total salt content, about 10,000 ppm or greater total salt concentration, or about 50,000 ppm or greater total salt concentration, the ppm being based on weight. For example salinity conditions that can cause cargo release can be about 1,000 ppm to about 300,000 ppm total salt content, about 1,500 ppm to about 200,000 ppm total salt content, or about 2,000 ppm to about 100,000 ppm total salt content.

The second set of conditions under which cargo release can occur can encompass any one of the conditions noted above in the ranges noted above. The second set of conditions under which cargo release can occur can encompass two or more of the conditions noted above in the ranges noted above. For example, cargo release can occur based on any one of the temperatures, pressures, pH ranges, shear rates, and salt concentrations noted above. In some embodiments, cargo release can occur when the particles are subject to any of the following combinations of conditions noted above: temperature and pressure; temperature and pH; temperature and shear; temperature and salinity; pressure and pH; pressure and shear; pressure and salinity; pH and shear; pH and salinity; shear and salinity; temperature, pressure, and pH; temperature, pressure, and shear; temperature, pressure, and salinity; temperature, pH, and shear; temperature, pH, and salinity; temperature, shear, and salinity; pressure, pH, and shear; pressure, pH, and salinity; pressure, shear, and salinity; pH, shear, and salinity; temperature, pressure, pH, and shear; temperature, pressure, pH, and salinity; temperature, pressure, shear, and salinity; temperature, pH, shear, and salinity; and pressure, pH, shear, and salinity.

The particles may vary in size and may be defined as microcapsules/microparticles or nanocapsules/nanoparticles. The particles may have an average size (e.g., diameter) of less than about 5 μm, less than about 1 μm, less than about 500 nm, or less than about 100 nm. In some embodiments, the particles can have an average size of about 20 nm to about 5 mm, about 30 nm to about 1 mm, about 40 nm to about 500 μm, about 50 nm to about 5 μm, or about 100 nm to about 900 nm. It is particularly beneficial according to the present disclosure to be able to provide controlled release particles (e.g., in a core/shell configuration or other cargo/vehicle configuration) in a sub-micron form.

If desired, particles according to the present disclosure can be surface modified to provide improved mobility, such as through a petroleum formation. This can be particularly useful in that the particles can specifically be sized for passage into the pores of a petroleum formation. In a non-limiting example, a particle can be modified with poly (2-acrylamido-2-methylpropanesulfonate-co-acrylic acid) to impart greater mobility through sandstone reservoirs. Further, similar modifications can be used as desired to match particle properties with the nature of the formation so as to improve mobility.

The particles can be prepared using chemical processes, physico-chemical processes, physico-mechanical processes, or combinations thereof. Non-limiting examples of chemical processes for preparing particles includes suspension polymerization, emulsion polymerization, dispersion polymerization, polycondensations polymerization, and combinations thereof. Non-limiting examples of physico-chemical processes for preparing particles includes coacervation, layer-by-layer assembly, sol-gel encapsulation, supercritical $CO_2$ encapsulation, and combinations thereof. Non-limiting examples of physico-mechanical processes for preparing particles includes spray drying, multiple nozzle drying, fluid bed coating, centrifugal techniques, vacuum encapsulation, electrostatic encapsulation, and combinations thereof.

In some embodiments, a core-shell particle (i.e., any configuration wherein the vehicle substantially surrounds the cargo) can be formed by an interfacial reaction between two immiscible monomers at the interface between the core component (e.g., the cargo) and surrounding solution. Non-limiting examples of monomers used in the interfacial reactions include cyanoacrylate, urethane, epoxy, and Diels alder monomers. In some preferred embodiments, a shell can be formed on a microgel particle by an interfacial polymerization reaction at the interface between the microgel particle and the monomer in the continuous phase. A core-shell particle comprising a polymeric, gelled core covered in a thermoset polymer shell, for example, can be configured to be swellable in the presence of a solution, particularly an aqueous solution, such as salt solutions, acid solutions, or surfactant solutions. Such mechanism can be beneficial to cause spontaneous rupture of the shell and release of cargo in the gel core. In some embodiments, a core-shell particle can be prepared by precipitation of the polymer in a continuous phase. In one example, the polymer shell can be formed by an interfacial reaction between an epoxy monomer and an amine monomer. In a preferred example, core-shell particles can be prepared using an oil-in-water mini-emulsion technique with an epoxy-based monomer. Other methods may also be used, and any method suitable for use according to the description otherwise provided herein can be used.

As described above, certain embodiments of the present disclosure encompass multi-layered particles. Such particles can be prepared in a layer-by-layer fashion to provide for controlled release of one or more different materials at different times and/or rates. For example, surfactants particularly can be utilized as cargo in such embodiments.

In some embodiments, the vehicle component may include a phase change material ("PCM"). By way of example, a suitable PCM may be one that responds to an elevated temperature by transitioning from a crystalline solid phase to a liquid phase. At ambient temperature, the PCM may be solid. In a non-limiting example, a useful PCM is stearic acid, which liquefies at 70° C. Similar PCMs may be identified for use based upon the nature of the environment where the particles of the present system may be used. Polymers that exhibit a glass transition temperature and/or a melt temperature may be useful as PCMs according to the present disclosure.

Useful PCMs may be adapted to transition between solid and liquid states or between liquid and vapor states under specified conditions. For example, the PCM may be adapted to be a solid up to a temperature of about 30° C., about 40° C., about 50° C., about 60° C., or about 70° C. and is a liquid at greater temperatures. For example, forms of paraffin wax have melting points ranging from 50-80° C., glyceryl trimyristate has a melting point of 56° C., polyethylene glycol ("PEG") 2000 and 4000 have a melting point of 56° C., beeswax has a melting point of 61-65° C., stearic acid has a melting point of 69° C., and cholesterol has a melting point of 148° C. Useful exemplary PCMs are stable up to relatively high temperatures, such as may be encountered in hydrocarbon-bearing reservoirs, or the like. For example, a PCM may remain stable up to a temperature of about 125° C. or greater, about 150° C. or greater, or about 175° C. or greater. The PCM can be used in a vehicle component (e.g., in forming a shell) such that, at the increased temperatures of a petroleum formation, the PCM will at least partially melt and thus destabilize the shell so that the cargo may be released. Non-limiting examples of PCMs that may be used in embodiments of the present systems include unsaturated fatty acids (e.g., myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, and erncic acid), saturated fatty acids (e.g., caprylic acid, capric acid, lauric acid, myristic acid, palmitic acid, stearic acid, arachidic acid, arachidic acid, behenic acid, lignoceric acid, and cerotic acid), triglycerides (e.g., glyceryl trimyristate), and waxes (e.g., bees wax, lanolin, carnauba wax, candelilla wax, and paraffin wax).

In some embodiments, systems and methods according to the present disclosure may be useful in relation to hydrocarbon-bearing reservoirs. For example, the present systems and methods can be adapted for use with a variety of technologies useful for exploration, development, and/or production of hydrocarbons from reservoirs. Enhanced oil recovery technologies and the like are non-limiting examples of technologies that can benefit from the present systems and methods. Because of the harshness of the conditions that are typical in hydrocarbon-bearing reservoirs, the present delivery and release systems are particularly beneficial in that they are adapted to provide intact delivery of a material to environments, even under such harsh conditions. Embodiments of the present systems thus can be useful in a wide variety of instances where delivery of a material in a hydrocarbon-bearing reservoir may be beneficial to evaluate a condition of the reservoir, identify a property of the reservoir, improve removal of a hydrocarbon from the reservoir, or the like.

Example 1

Preparation of Core-Shell Particles Encapsulated with Dye

Figure 8:
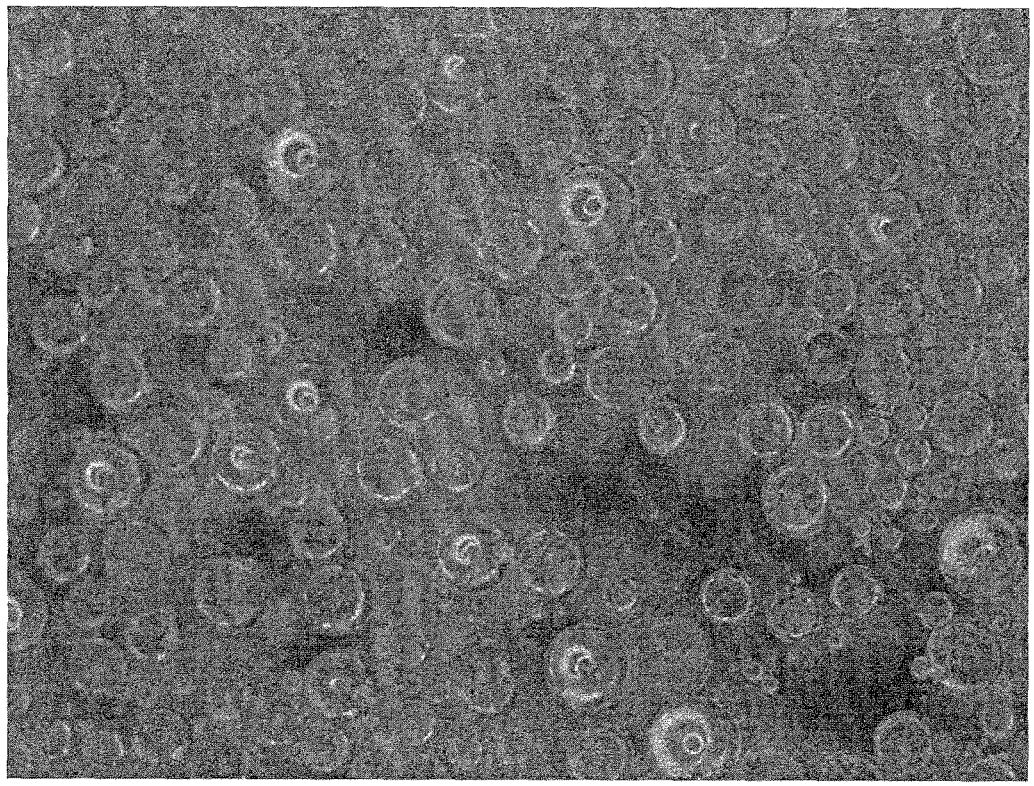
FIG. 8 shows a microscopy image of core-shell particles comprising a shell of poly-HDDA and a core of blue food dye according to one or more embodiments of the present disclosure.

Core-Shell particles were prepared using a water-in-oil-in-water double emulsion process. An organic solution was prepared by combining 1,6-hexanediol diacrylate (HDDA), 2 wt % of Span-80, and 2 wt % of (diphenyl(2,4,6-trimethylbenzoyl)phosphine oxide and hydroxyl-2-methlypropiophenone blend) and denoted as the Oil phase. An aqueous solution ($W_2$) was prepared which consisted of 1.3 wt % of Tween 80/Pluronic F127 blend. Another aqueous solution ($W_1$) was prepared using 10 mls of 50% polyacrylamide in water solution (PAAM) (1,500 MW) and 2 drops of blue food-grade dye. The particles were prepared by adding 1 mL of the ($W_1$) aqueous solution into a vial already containing 10 mL of organic solution. The whole mixture was rigorously mixed for two minutes until the aqueous phase was sufficiently dispersed into the organic phase. This mixture was added into an aqueous solution comprising 1.3 wt % of Tween 80/Pluronic F127 blend. This entire mixture was subsequently irradiated with 365 nm light using an Omnicure 5000 for 5 minutes. FIG. 8 shows a microscopy image of core-shell particles containing the blue food-grade dye within the core.

Example 2

Figure 9A:
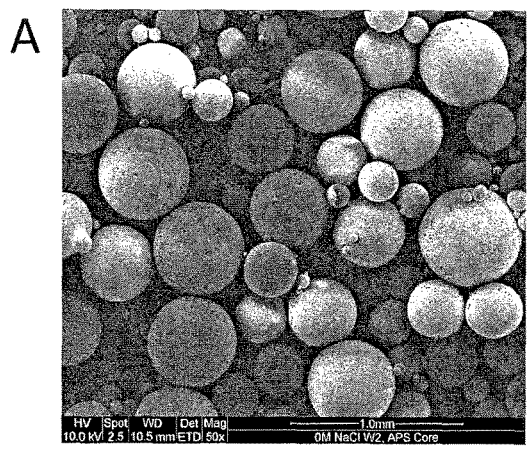
FIG. 9A shows a scanning electron microscopy ("SEM") image of core-shell particles with a shell of 1,6-Hexanediol ethoxylate diacrylate polymer ("poly-HEDA") and a core of ammonium persulfate breaker according to one or more embodiments of the present disclosure.
Figure 9B:
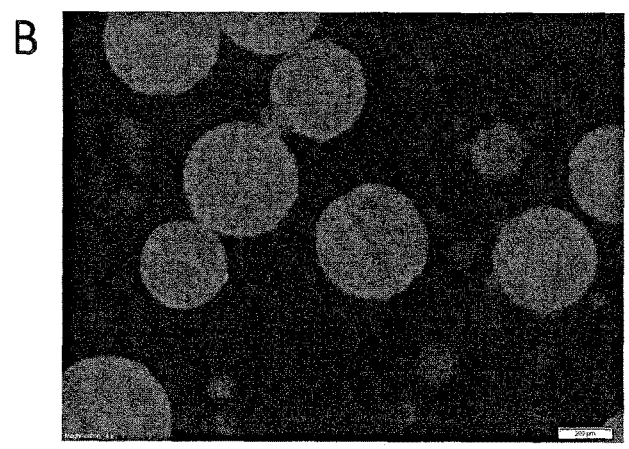
FIG. 9B shows a fluorescence image of core-shell particles with a shell of poly-HEDA and a core of ammonium persulfate breaker and fluorescein according to one or more embodiments of the present disclosure.

Preparation of Core-Shell Particles Encapsulated with the Ammonium Persulfate Breaker Core-Shell particles are prepared using a water-in-oil-in-water double emulsion process. An organic solution was prepared by combining 94 wt % of 1,6-Hexanediol ethoxylate diacrylate, 3 wt % of photoinitiator (Blend of diphenyl (2,4,6-trimethylbenzoyl)phosphine oxide and 2-hydroxy-2-methylproppiophenone), 1 wt % of Span-80. n aqueous solution, termed 'W2', is prepared by combining 1.5 grams of Pluronic F127, 7.5 grams Tween-80, and 741 grams of water. A second aqueous solution, termed 'W1', was prepared by combining 1.219 grams of ammonium persulfate in 5.342 mL of deionized water. 1 gram of W1 was added to 10 grams of the oil phase and the mixture was homogenized for 2 minutes at 11,200 rpm to produce an emulsion. The emulsion was then added to 300 grams of W2 that was mixing. The entire system was then exposed to light (250 nm to 450 nm wavelength of light) for 5 minutes at room temperature. After five minutes, core-shell particles were evident, where the core comprises the W1 solution and the shell comprises the polymerized oil phase. FIG. 9A and FIG. 9B show the presence of the core-shell particles. ICP analysis shows that 4203 µg of sulfur is present per 1 gram of particles. ICP analysis shows that 101 µg of sulfur is present per 1 gram of particles for core-shell particles without ammonium persulfate. The ICP data, therefore, shows the encapsulation of the ammonium persulfate breaker.

Example 3

Figure 10:
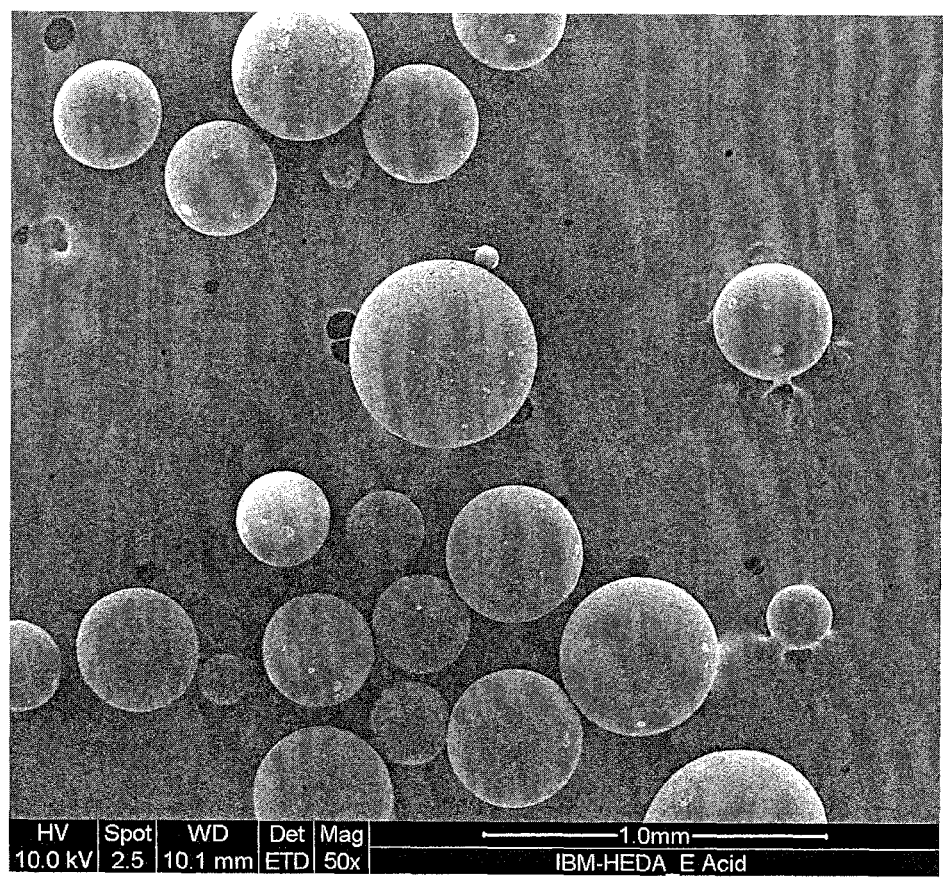
FIG. 10 shows an SEM image of core-shell particles with a shell of 1,6-Hesanediol ethoxylate diacrylate and isobromyl methacrylate and a core of etidronic acid scale inhibitor according to one or more embodiments of the present disclosure.

Preparation of Core-Shell Particles Encapsulated with the Etidronic Acid Scale Inhibitor Core-Shell particles are prepared using a water-in-oil-in-water double emulsion process. An organic solution was prepared by combining 94 wt % of monomer mixture (where the monomer mixture comprises l0 wt % of 1,6-Hexanediol ethoxylate diacrylate and 90 wt % isobornyl methacrylate), 3 wt % of photoinitiator (Blend of diphenyl (2,4,6-trimethylbenzoyl)phosphine oxide and 2-hydroxy-2-methylproppiophenone), 1 wt % of Span-80. An aqueous solution, termed 'W2', was prepared by combining 1.5 grams of Pluronic F127, 7.5 grams Tween-80, and 741 grams of water. A second aqueous solution, termed 'W1', was prepared by combining 0.5190 grams of etidronic acid in 2.317 mL of deionized water. 1 gram of W1 was added to 10 grams of the oil phase and the mixture was homogenized for 2 minutes at 11,200 rpm to produce an emulsion. The emulsion was then added to 300 grams of W2 that was mixing. The entire system was then exposed to light (250 nm to 450 nm wavelength of light) for 5 minutes at room temperature. After five minutes, core-shell particles were evident, where the core comprises the W1 solution and the shell comprises the polymerized oil phase. FIG. 10 shows an SEM image of the core-shell particles encapsulated with etidronic acid. ICP analysis shows that 4927 µg of phosphorus is present per 1 gram of particles containing etidronic acid. ICP analysis shows that 684 µg of phosphorus is present per 1 gram of particles for core-shell particles without etidronic acid. The ICP, therefore, shows the encapsulation of the etidronic acid scale inhibitor.

Example 4

Preparation of Core-Shell Particles Containing a Temperature Responsive Shell with Phase Change Material Core-Shell particles are prepared using a water-in-oil-in-water double emulsion process. An organic solution was prepared by combining 94 wt % of monomer mixture (where the monomer mixture comprises 98 wt % of 1,6-Hexanediol ethoxylate diacrylate and 2 wt % of paraffin wax with a melting point of 60° C.), 3 wt % of photoinitiator (Blend of diphenyl (2,4,6-trimethylbenzoyl)phosphine oxide and 2-hydroxy-2-methylproppiophenone), 1 wt % of Span-80. An aqueous solution, termed 'W2', was prepared by combining 1.5 grams of Pluronic F127, 7.5 grams Tween-80, and 741 grams of water. A second aqueous solution, termed 'W1', was prepared by combining 0.5190 grams of etidronic acid in 2.317 mL of deionized water. 1 gram of W1 was added to 10 grams of the oil phase and the mixture was homogenized for 2 minutes at 11,200 rpm to produce an emulsion. The emulsion was then added to 300 grams of W2 that was mixing. The entire system was then exposed to light (250 nm to 450 nm wavelength of light) for 5 minutes at 70° C. After five minutes of light exposure and subsequently incubated at room temperature for 10 minutes, core-shell particles were evident, where the core comprises the W1 solution and the shell comprises the polymerized 1,6-Hexanediol ethoxylate diacrylate with paraffin wax.

Here, the shell material contains a polymer integrated with a phase change material (i.e., paraffin wax in this case). When the particles are placed at temperatures above the PCM melting point, the shell weakens and releases the core material. The material of the shell can be varied by changing the concentration of the phase change material to control the release kinetics of the cargo material.

Example 5

Properties of Shell Material after Exposure to High Pressure, High Temperature Conditions Core-shell particles prepared via mini-emulsion polymerization are subjected to high pressure, high temperature conditions that emulate a reservoir. Specifically, the core-shell particles are prepared with shell material that contains either degradable chemical functional groups or no degradable chemical functional groups. Both sets of particles are immersed in brine (2 wt % $CaCl_2$, 8 wt % NaCl) and placed at 100° C. for 96 hours. Upon removal from these HPHT conditions, the particles with the degradable chemical functional groups lose structural integrity. Conversely, the particles prepared with no degradable groups remain intact, showing nearly identical properties after exposure to simulated reservoir conditions

Example 6

Preparation of Shell Material Comprising Epoxy Thermoset Material with Degradable Ester Groups Particles are prepared using monomers containing one or more ester chemical functional groups. Using a mini-emulsion with phase separation method, the AIBN thermal initiator and hydrophobic cargo is combined with either di(trimethylolpropane) tetraacrylate or acrylated EpAlloy 5200. These hydrophobic solutions are emulsified in an aqueous solution of 1 wt % of Tween 80/Pluronic F127 blend, 25 wt % of polyvinyl alcohol (PVA) (5,000 MW). The emulsion is heated at 80° C. for four hours. During the heating, the polymer phase separates from the hydrophobic cargo, thereby forming core-shell nanocapsules containing the hydrophobic cargo. When exposed to water, the particles degrade in a manner that correlates with the amount of ester in the shell of the particle.

Example 7

Preparation of Polymer Shell Material with Pressure Dependent Degradation

Samples were prepared by combining the Epon-828 epoxy monomer with Heloxy 66 and mixing in a Flacktek Speed Mixer at 1500 rpm until thoroughly blended (typically 120 sec). Next, the hollow glass beads (3M™ Glass Bubbles, S Series) were incorporated via spatula and subsequently mixed in the Flacktek Speed Mixer at 1500 rpm. Lastly, TETA was added and mixed in the Flacktek Speed Mixer at 1500 rpm. All samples contained a stoichiometric ratio of monomers (i.e., 1:2 molar ratio of diamine:diepoxide) and 50 volume % of the hollow glass spheres.

Experiments were performed to expose the samples to high pressure, high temperature (HPHT) conditions using a Fan Model 275 consistometer. DMA bars were immersed into a sealed bag containing approximately 15 mL of brine (8 wt % $CaCl_2$, 2 wt % NaCl), loaded into the HPHT chamber, and maintained at the desired pressure at 100° C. for two hours. After removal from the consistometer, DMA bars were rinsed with deionized water and the surfaces of the samples were dried prior to weighing by gently wiping the surface. A reflux setup was used for samples exposed to high temperature (i.e., 100° C.) for two hours at atmospheric pressure.

Figure 11:
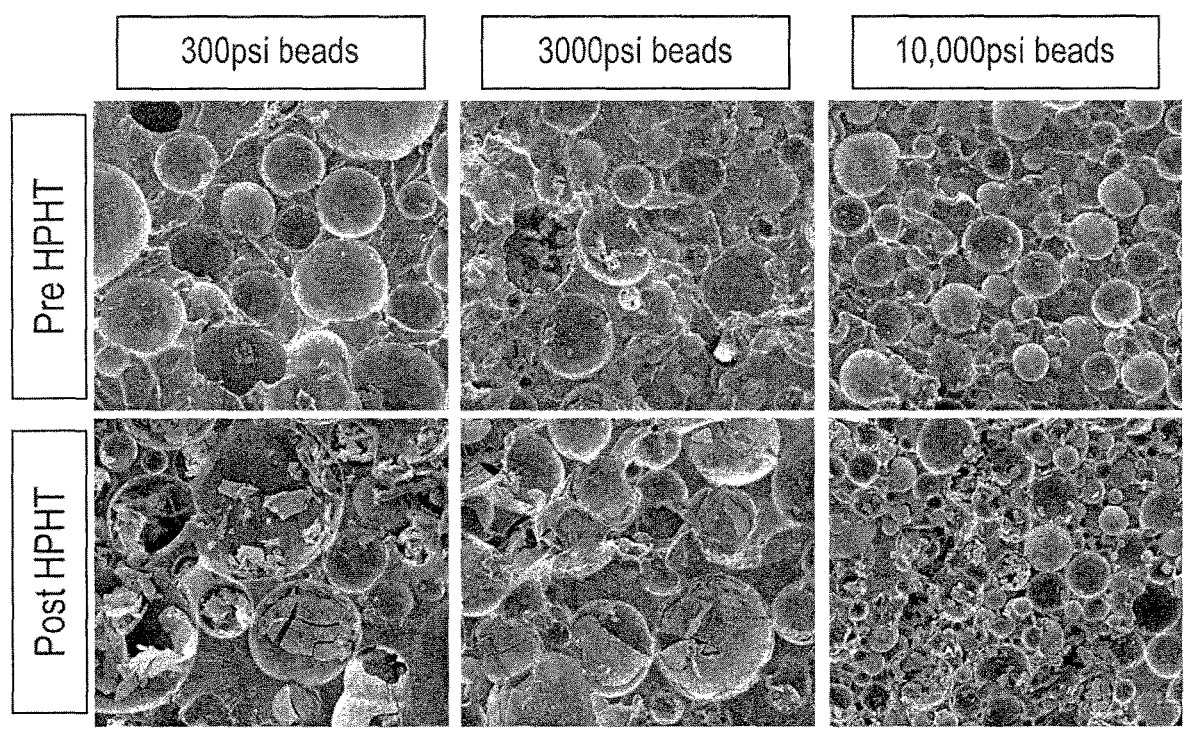
FIG. 11 shows an SEM image of epoxy material containing hollow shells according to one or more embodiments of the present disclosure formed of EPON™-828, HELOXY™61, triethylenetetramine (TETA), and hollow glass beads with crush strengths of 300 PSI, 3,000 PSI, and 10,000 PSI before and after subjection to crush strength testing.
Figure 12A:
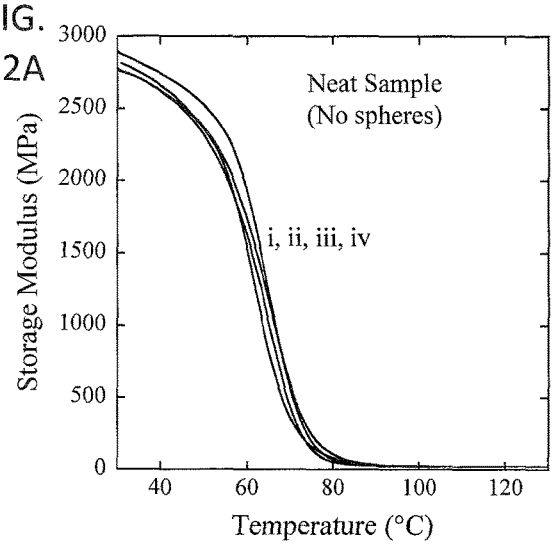
FIG. 12 shows graphs of storage modulus before and after application of pressure of the epoxy coating material containing the hollow shells illustrated in FIG. 11.
Figure 12B:
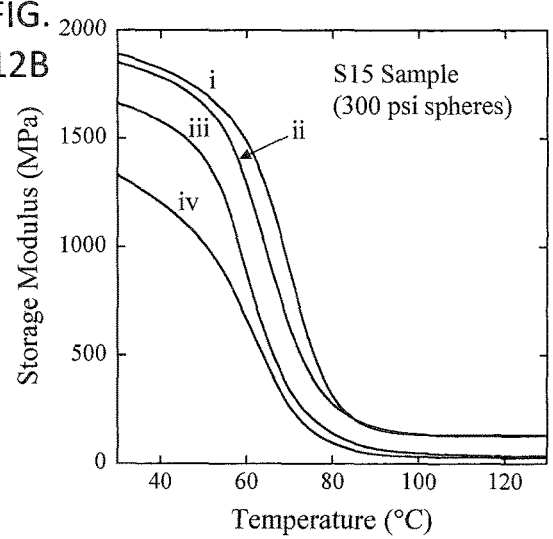
Figure 12C:
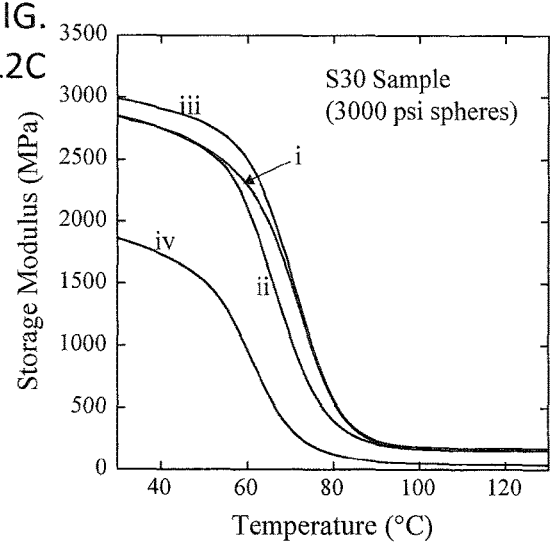
Figure 12D:
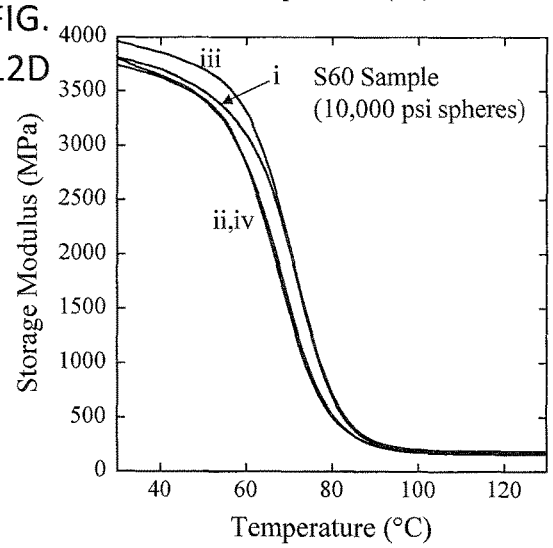

The mechanical properties of the syntactic foam samples were evaluated after exposure to elevated pressures in saline at 100° C. The resultant SEM images (FIG. 11) support that the exposure of samples to pressures above the crush strength of the hollow spheres results in fracture of the glass spheres. The crush strength of the hollow glass spheres within the epoxy matrix, coupled with the extent of pressure exposure, dictates the resultant microstructural features and associated viscoelastic properties of the material. The storage modulus profiles in FIG. 12 and compiled data in FIG. 13 support this concept, revealing that syntactic foams exposed to pressures above the crush strength of the embedded hollow glass spheres exhibit a drastic reduction in the storage modulus values at all tested temperatures. For example, the storage modulus (at 35° C.) for the ES35 sample is 2865±52 MPa after exposure to 1500 psi, but decreases to 1562±68 MPa after exposure to 15,000 psi. Importantly, the samples were dried prior to performing the DMA experiments to substantially eliminate the effects of the water uptake during mechanical. As expected, material devoid of hollow glass spheres exhibits near identical storage modulus profiles with and without exposure to different pressures at 100° C. (FIG. 12, FIG. 13).

Example 8

Preparation of Polymer Shell Material Using an Interfacial Epoxy Reaction

Figure 14:
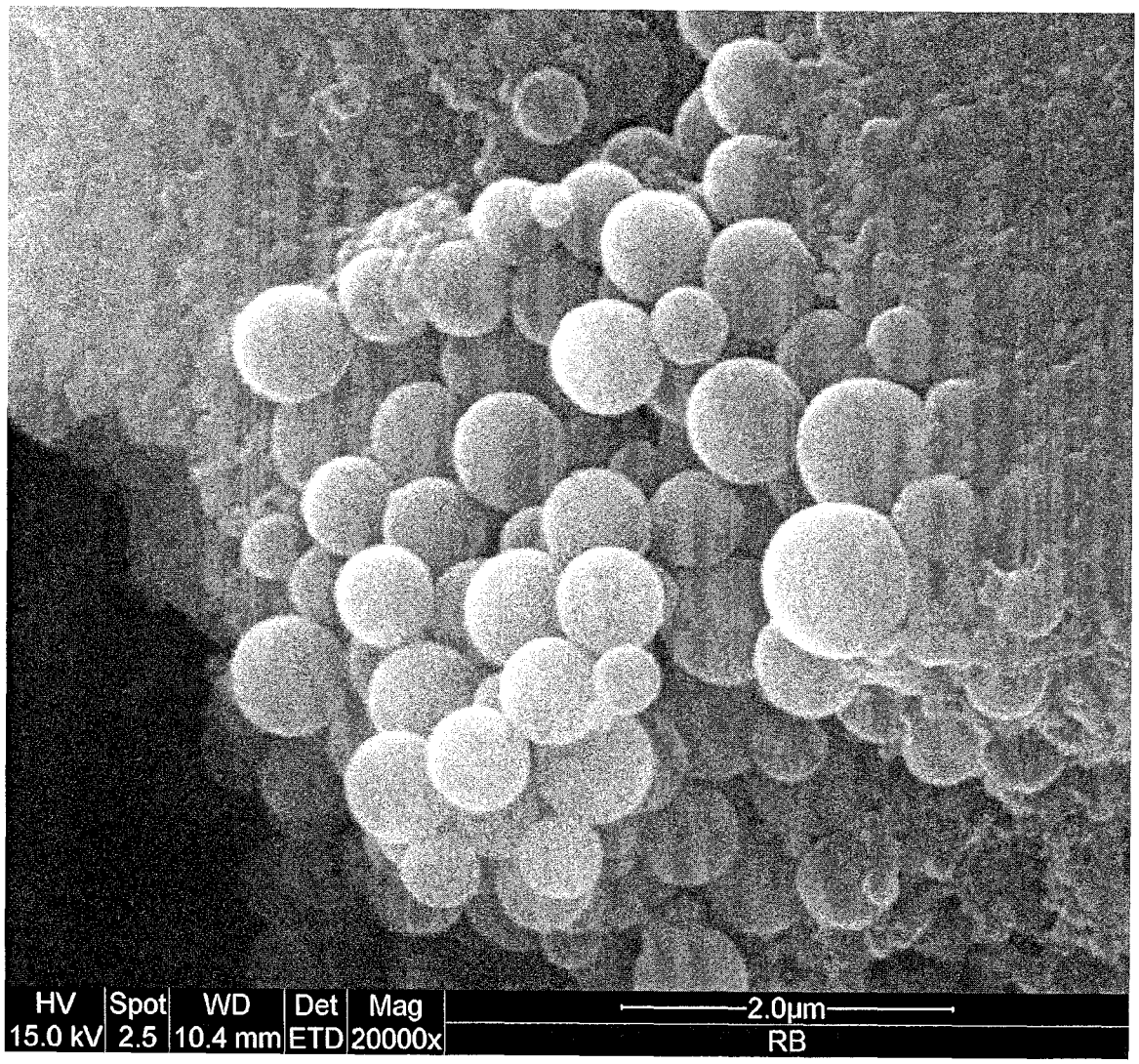
FIG. 14 shows an SEM image of hollow shells according to one or more embodiments of the present disclosure formed of EPON™825 Bis-A epoxy with diethylenetriamine ("DETA")

Particles with epoxy-based shells were prepared by interfacial polymerization. An oil-phase solution was prepared by combining 2.0 g of Epon 825 Bis-A epoxy with 0.2 g Tween 20 surfactant and 0.006 g Rhodamine B. An ultrasonic bath was used to dissolve the dye into the resin solution. Next, 10 g of deionized water was added to the oil phase and mixed by vortex mixer to form an emulsion. An aqueous phase solution was prepared by adding 0.2 g diethylenetriamine (DETA) into 2.0 g deionized water. The aqueous phase was then added to the emulsion and stirred for 2 days at 50° C. The resulting solution was allowed to settle and then pulled through a 3 μm syringe filter prior to imaging via SEM (FIG. 14).

Example 9

Preparation of Core-Shell Particles Using Diels Alder Monomers

Particles are prepared using Diels Alder monomers, one monomer containing a conjugated diene and one monomer containing a dienophile. The particles are made using an interfacial polymerization reaction, where the conjugated diene contains a furan functional group and a dienophile contains one or more ester chemical functional groups. In one example, the dienophile is 3-nitroacylate. Using an interfacial polymerization reaction, the two monomers interact at the core-continuous phase interface to generate a core-shell structure.

Example 10

Preparation of Particles Comprising a Hydrogel Core and a Thermoset Shell

Core-shell particles were prepared that comprise a polymeric, gelled core covered in a thermoset polymer shell. Cores were prepared that comprise Poly (ethylene glycol) dimethacrylate (PEGMDA) that are swelled with water and fluorescein. The cores are then covered with a hexanediol diacrylate (HDDA) shells using a water-in-oil-in-water protocol. A ratio of 2:1 HDDA to PEGDMA (shell to core polymer) was used to promote thin shells. Used A water soluble initiated (Irgacure 2959) was included in the internal water phase to promote curing from the inside out. Briefly, a solution of 1% Tween 80 surfactant and 1% Pluronic F127 was used for both the continuous and internal water phases. To the 1 g of internal water phase, 0.05 g of Irgacure 2959 and 1 g of PEGDMA were added. This was mixed with 2 g of Hexanediol diacrylate (HDDA), and the full mixture was added drop wise into 100 mL of continuous aqueous phase. The emulsion was cured for 5 minutes via photo polymerization and collected.

In another example, interfacial polymerization of cyanoacrylate onto a PEGDMA particle was used where the PEGDMA particles were pre-loaded with NaCl and surfactant solution. Aqueous solution containing 3 g of 5M NaCl, 0.15 g Triton X-100, 0.3 g DPT photoinitiator, and 3 g of PEGDMA was emulsified drop wise into 45 g of mineral oil and cured. Cyanoacrylate (600 μL) was then added to the emulsification and cured via interfacial polymerization onto the surface of the loaded PEGDMA particles.

Example 11

Preparation of Core-Shell Particles Comprising a Silicone Shell

Figure 15:
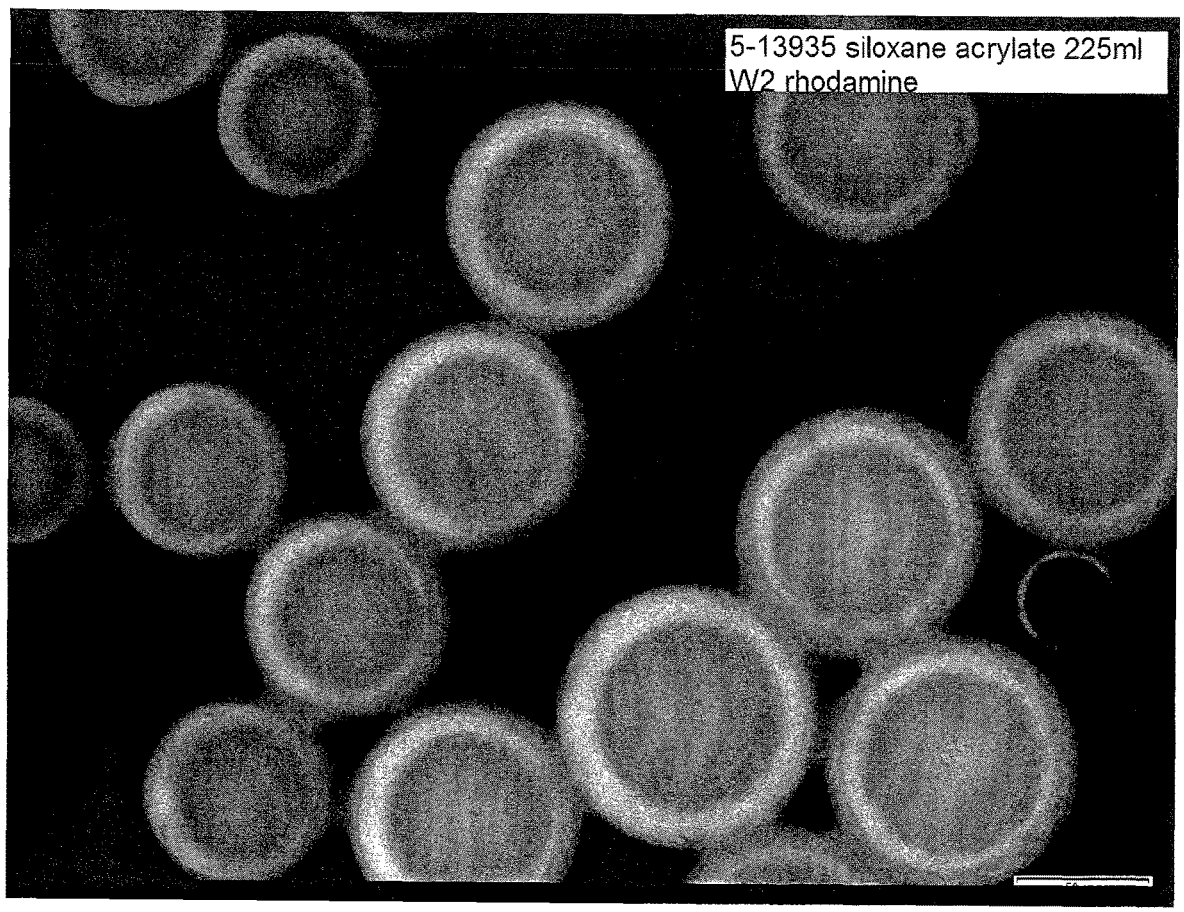
FIG. 15 shows a fluorescence image of core-shell particles with a shell of polymerized silicone diacrylate and a core of fluorescein according to one or more embodiments of the present disclosure.

Core-Shell particles are prepared using a water-in-oil-in-water double emulsion process. An organic solution was prepared by combining 94 wt % of monomer mixture (where the monomer mixture comprises 99 wt % of silicone diacrylate and 0.2 wt % of photoinitiator (Blend of diphenyl (2,4,6-trimethylbenzoyl)phosphine oxide and 2-hydroxy-2-methylproppiophenone), 0.2 wt % of Span-80. An aqueous solution, termed 'W2', is prepared by combining 4.5 grams of Pluronic F127, 4.5 grams Tween-80, and 450 grams of water. A second aqueous solution, termed 'W1', was prepared by combining 0.10 grams of fluorescein in 10 mL of deionized water. 2 ml gram of W1 was added to 10.4 grams of the oil phase and the mixture was vortexed for 1 minute at 3000 rpm to produce an emulsion. The emulsion was then added to 350 ml of W2 that was mixing. The entire system was then exposed to light (250 nm to 450 nm wavelength of light) for 3 minutes at 25° C. After three minutes of light exposure, core-shell particles were evident, where the core comprises the W1 solution and the shell comprises the polymerized silicone diacrylate (FIG. 15).

Example 12

Highly Concentrated Surfactant Delivery System for Nano-Enhanced Chemical Enhanced Oil Recovery ("CEOR")

Surfactants are well known for use in the oil industry to enhance oil recovery, and many anionic, nonionic, and cationic surfactants have been studied, each exhibiting a different set of mechanisms for effective action. Provided according to embodiments of the present disclosure are surfactant delivery systems that can be particularly used in CEOR to overcome problems in the art for utilization of surfactants in oil recovery, such as loss of significant amounts of surfactant through rock adsorption. The surfactant delivery systems can provide reduced cost and more effective use of surfactants, particularly deep within the wellbore region. The present systems are further beneficial in that a substantially slow and continuous release of surfactant can enable the surfactant to reach an equilibrium interaction with residual oil, thus increasing the effectiveness of the designed surfactant and resulting in improved mobility. The surfactant delivery systems overcome loading problems in known systems where a surfactant may be encapsulated in a controlled release polymer shell, which systems typically achieve no greater than 20-30% loading capacity. The presently disclosed surfactant delivery systems can, in some embodiments, be comprised almost exclusively of surfactant, thus enabling up to 100% surfactant loading in controlled release particles. Further, methods of forming the particles can be readily tuned to produce particles of a size less than 5 μm, such as in the range of about 10 nm to about 1000 nm.

Figure 16:
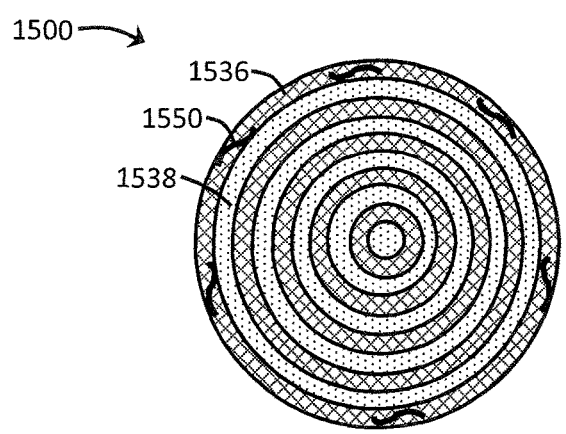
FIG. 16 shows a cross-section of a multi-layer particle according to one or more embodiments of the present disclosure.

The particles can be formed via layer-by-layer (LBL) construction, such as a thin film fabrication technique whereby a structure is built up by depositing sequential layers of charged materials. The layers in such embodiments can be comprised of oppositely charged materials, or the layers may comprise the same material if alternating layers are treated with differently charged ions, such as during a wash step. Due to the step growth of such layers, there is good control over particle size. Labile crosslinking groups (e.g., oil-labile crosslinking groups) are included within two or more layers (or all layers, if desired), to provide stability and a triggered release mechanism. In some embodiments, crosslinks can be provided in only the outermost layer or outermost two to three layers to provide a delayed release of the entire cargo content. Non-limiting examples of polymers that are sensitive to hydrocarbons include polymethyl methacrylates and polyesters. The surfactants in the particles can be crosslinked at varying densities to achieve the desired release kinetics, particularly the exterior chain, which can contain a high degree of multifunctional crosslinking molecules as well as chemistry that prohibits adsorption to the reservoir. This configuration enables careful control over size and high loading of material when compared to traditional technologies. An exemplary multi-layer particles is illustrated in FIG. 16, wherein the particle 1500 comprises a first surfactant 1536 and a second surfactant 1538 in alternating layers. Crosslinks 1550 are shown in the two outermost layers.

Example 13

Preparation of Particles Containing Azo-Based Shells with Temperature Controlled Degradation Particles with shells that degrade with increased temperature were prepared by interfacial polymerization. An oil-phase solution was prepared by combining the oil soluble monomer (toluene diisocyanate (TDI)), the solvent (cyclohexane), and the surfactant (Span-80). Next, an aqueous phase was prepared by combining the monomer (2,2'-Azobis [2-methyl-N-(2-hydroxyethyl)propionamide]), the cargo ammonium persulfate, and the surfactant (Tween-20). The aqueous phase was then added to the oil phase and mixed by ultrasonication to form a nano-emulsion. The resulting nano-emulsion mixed at 60° C. to enable interfacial polymerization between the TDI and the 2,2'-Azobis[2-methyl-N-(2-hydroxyethyl)propionamide]), which formed the shell of the core-shell nanoparticle. The resulting core-shell nanoparticles are 500 nm in diameter. The nanoparticles remain stable until subjected to 80° C. for 2 hours, at which time the azo chemical bond degrades, releasing the ammonium persulfate cargo.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

The invention claimed is:

1. A delivery system comprising a plurality of particles that each comprise a vehicle and a cargo that is retained by the vehicle, the plurality of particles being configured to controllably release at least a portion of the cargo in response to one or more conditions at a delivery site, wherein the vehicle comprises a polymeric material including one or more labile crosslinking groups that degrade or are otherwise broken in response to the one or more conditions at the delivery site, and wherein one or more of the following conditions are met:

the vehicle is in the form of a shell defining an interior space in which the cargo is retained;
the vehicle is substantially in the form of a monolith;
the particles have an average size of about 5 μm or less.

2. The delivery system of claim 1, wherein the vehicle is in the form of a shell defining an interior space in which the cargo is retained, and the shell comprises a plurality of layers.

3. The delivery system of claim 1, wherein the vehicle is in the form of a shell defining an interior space in which the cargo is retained, and the interior space comprises a core material with which the cargo is combined.

4. The delivery system of claim 1, wherein the vehicle is in the form of a shell defining an interior space in which the cargo is retained, and the cargo is configured as a plurality of units within the interior space defined by the shell.

5. The delivery system of claim 1, wherein the vehicle is in the form of a shell defining an interior space in which the cargo is retained, and the cargo is controllably diffusible through the shell.

6. The delivery system of claim 1, wherein the vehicle is at least partially degradable via a mechanism selected from the group consisting of thermal degradation, oxidative degradation, chemical degradation, photodegradation, pressure-dependent degradation, ultrasonic degradation, mechanical degradation, and combinations thereof.

7. The delivery system of claim 1, wherein the cargo comprises at least one material selected from the group consisting of breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

8. The delivery system of claim 1, wherein the particles have an average size of about 1 μm or less.

9. The delivery system of claim 1, wherein the particles have an average size of about 500 nm or less.

10. A method for providing a cargo to a petroleum reservoir, the method comprising delivering to the petroleum reservoir a delivery system according to claim 1, wherein the petroleum reservoir exhibits one or more conditions under which the plurality of particles release at least a portion of the cargo.

11. The method of claim 10, wherein the vehicle is at least partially degradable, and the petroleum reservoir exhibits one or more conditions under which the polymeric material at least partially degrades.

12. The method of claim 10, wherein the cargo controllably diffuses through the shell in the petroleum reservoir.

\* \* \* \* \*